March 20, 1956 R. D. GERWE 2,738,761
MATERIAL APPLICATOR FOR FRUITS AND VEGETABLES
Filed Aug. 28, 1951 4 Sheets-Sheet 1
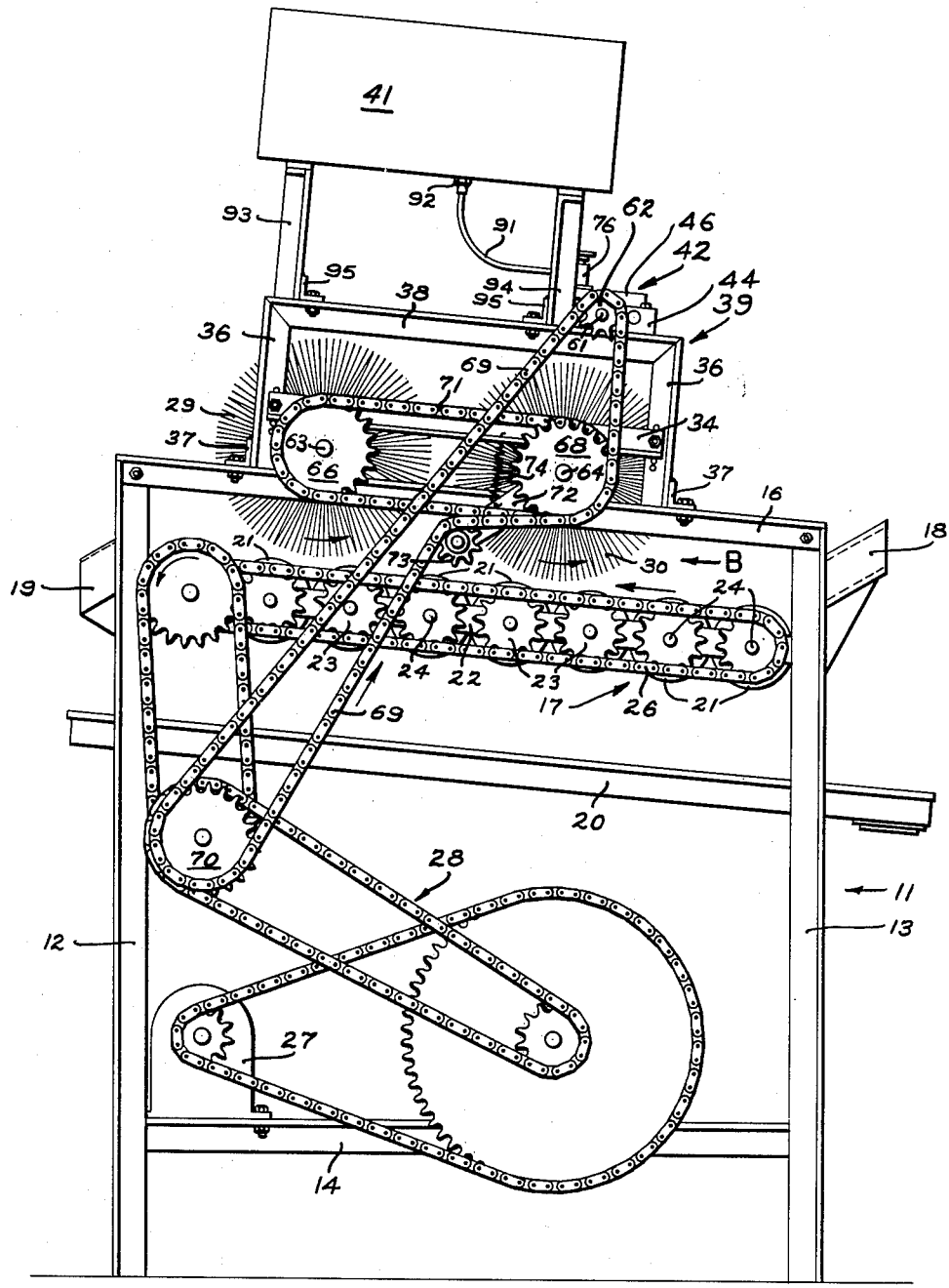
FIG_1
INVENTOR
RAYMOND D. GERWE
BY *Hans G. Hofmeister*
ATTORNEY March 20, 1956 R. D. GERWE 2,738,761
MATERIAL APPLICATOR FOR FRUITS AND VEGETABLES
Filed Aug. 28, 1951 4 Sheets-Sheet 2
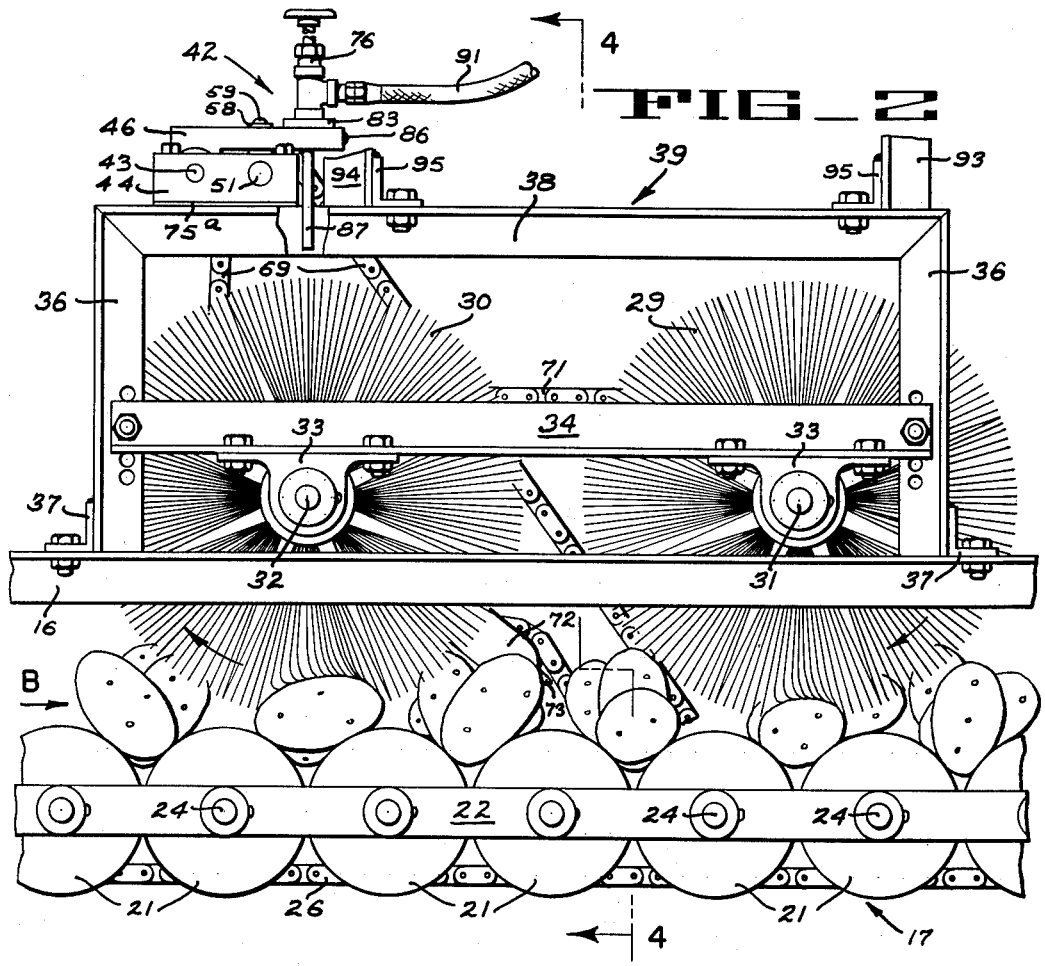
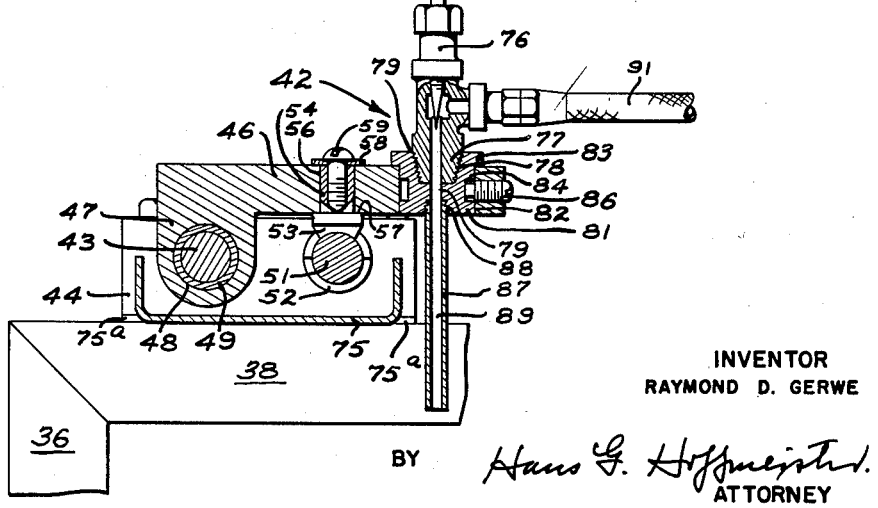
INVENTOR
RAYMOND D. GERWE
BY Hans G. Hoffmeister.
ATTORNEY

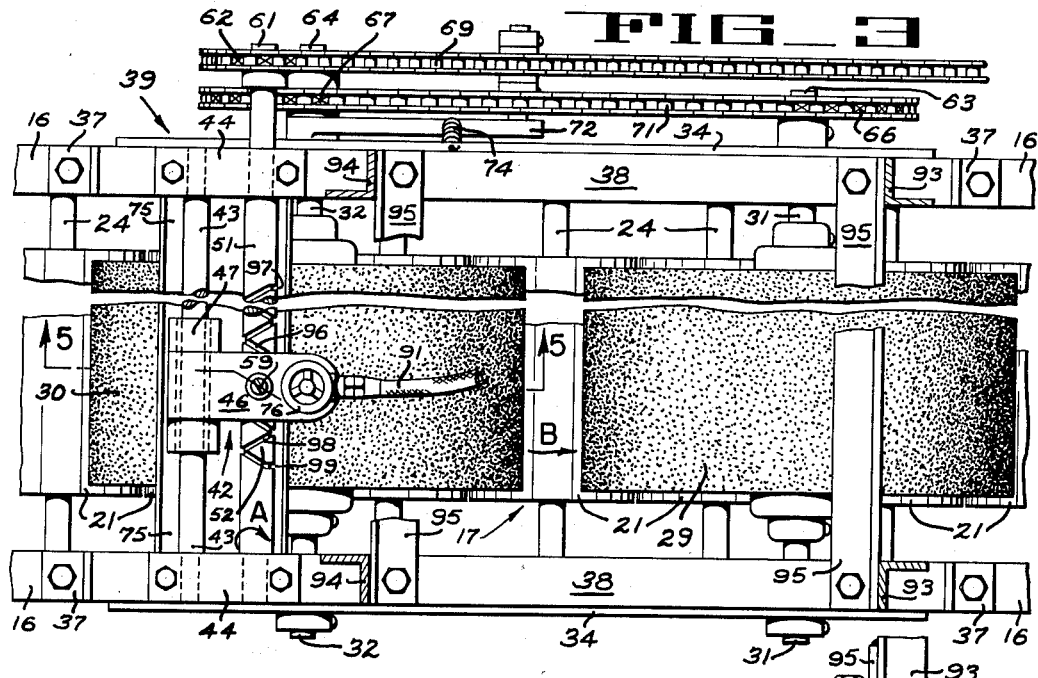
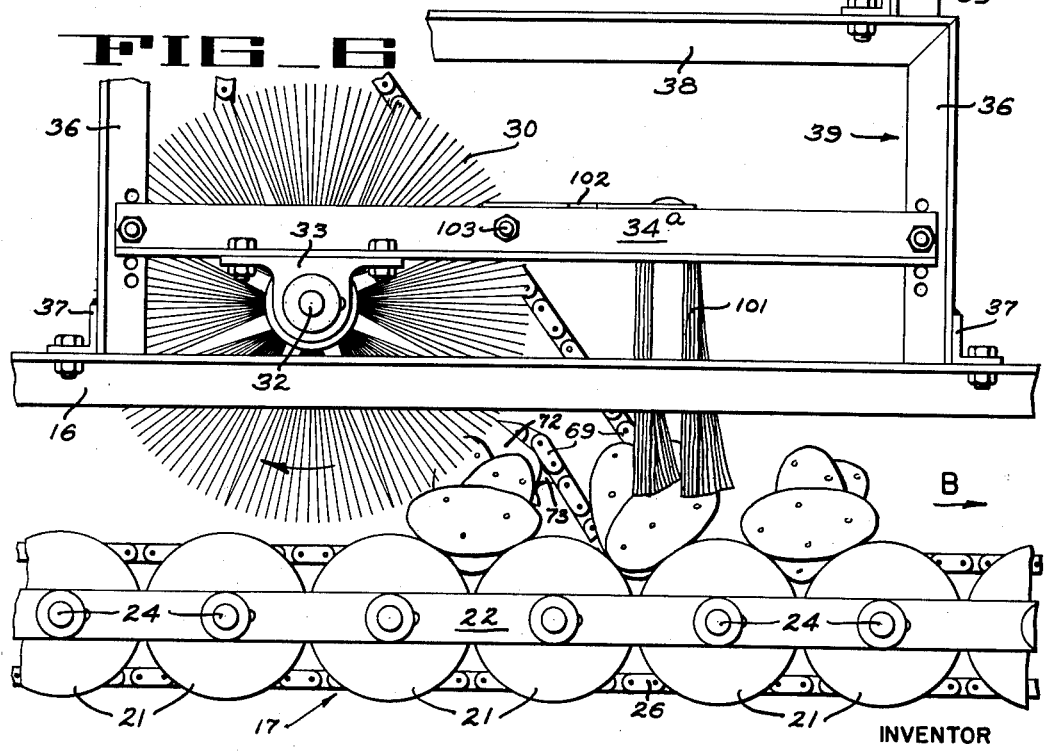

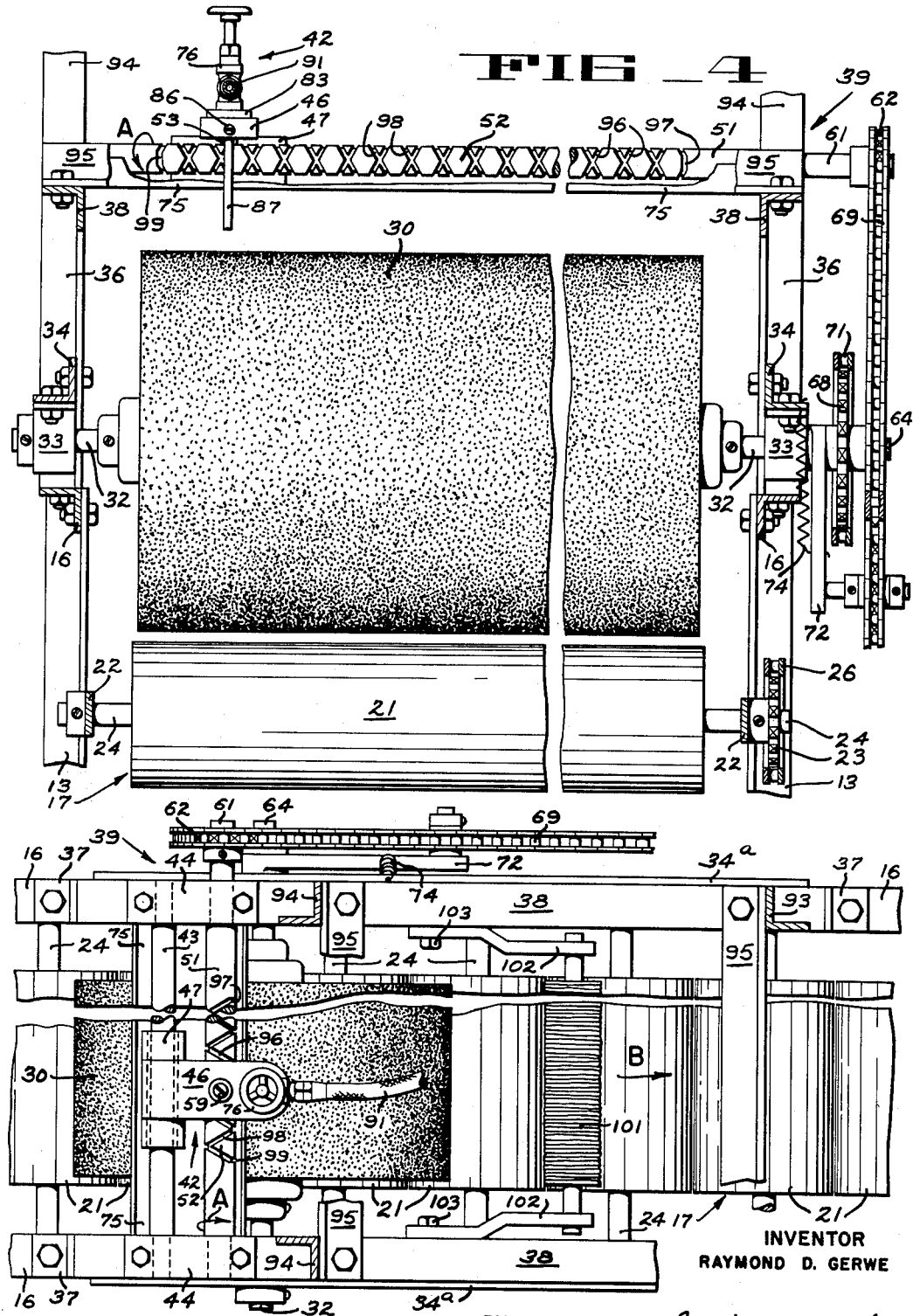

United States Patent Office 2,738,761
Patented Mar. 20, 1956

2,738,761

MATERIAL APPLICATOR FOR FRUITS AND VEGETABLES

Raymond D. Gerwe, Lakeland, Fla., assignor to Food Machinery and Chemical Corporation, San Jose, Calif., a corporation of Delaware Application August 28, 1951, Serial No. 244,057

3 Claims. (Cl. 118—13)

This invention relates to an apparatus for applying flowable material to the outer surface of articles; said apparatus being particularly well adapted to the application of water-wax emulsions, adherent powders, detergent solutions, fungicidal and/or bactericidal solutions and the like, to food commodities such as fresh fruit and vegetables.

In the commercial preparation for market of fresh fruit and vegetables, for example, oranges and potatoes, it is common practice to wash the produce, using a soap or detergent solution, dry it, and subsequently wax and polish it to enhance the appearance thereof and to preserve said produce. In order to destroy bacteria and to inhibit the growth of mold on the fruit and vegetables, they are sometimes also treated with a bactericide and/or a fungicide before they are waxed and polished.

These operations may all be performed on the produce while it is being conveyed from a receiving station to a packing station by apparatus well known in the art, namely, transverse roll conveyors. Said transverse roll conveyors comprise a series of closely spaced transversely mounted brushes or rollers over which the fruit or vegetables are both rotated and conveyed by the rotation of said brushes or rollers. Since the introduction of these transverse roll conveyors a number of devices for association with said conveyors have been devised and used to apply the various flowable materials employed in the above mentioned preparation processes to the food produce. However, none of these devices has been very successful in applying said materials evenly over the surface of all of the processed produce.

It is an object of the present invention to provide an apparatus for evenly and efficiently applying a flowable material to the surface of articles, such as fruit and vegetables.

It is an object of this invention to provide an improved applicating device for coating the surface of articles with a thin film of flowable material.

It is another object of the present invention to provide an apparatus for distributing a flowable material uniformly over the surface of a cylindrical, rotatably mounted material applying roller.

A further object of this invention is to provide a relatively inexpensive apparatus for evenly applying in a controlled manner a thin film of a flowable material to the outer surface of articles, such as fruit and vegetables.

These and other objects and advantages of the present invention will become apparent from the following description and the accompanying drawings wherein:

Fig. 1 is a left side elevation of an embodiment of the invention.

Fig. 2 is an enlarged right side elevation of a portion of the machine, the view being aligned with the horizontal.

Fig. 3 is a plan view of the mechanism shown in Fig. 2.

Fig. 4 is a vertical section along the line 4—4 of Fig. 2.

Fig. 5 is a section taken substantially along the line 5—5 of Fig. 3.

Fig. 6 is a view similar to Fig. 2 of a modified embodiment of the invention.

Fig. 7 is a plan view of the mechanism disclosed in Fig. 6.

The embodiments of the invention disclosed in the drawings and hereinafter described are adapted to apply a liquid, such as a water-wax emulsion, uniformly to the outer surface of fruit or vegetables, for example, red Irish or sweet potatoes. As illustrated in the drawings, the apparatus is carried on a suitable framework 11 (Fig. 1) composed of two pairs of upright, spaced, angle bars 12 and 13 which are joined near their lower ends by horizontally positioned angle bars 14, only one being shown. The pair of angle bars 12 are slightly longer than the pair of bars 13 and two angle irons 16 are supported in an inclined position between the upper ends of the bars 12 and 13.

A conventional transverse roller table 17 (Fig. 1) having feed and discharge chutes 18 and 19, respectively, and a drip pan 20 is mounted near the upper portion of the framework 11. The transverse rollers 21 of said table 17 are journaled in rails 22 (Fig. 4) secured between the bars 12 and 13 (Fig. 1). Said rails 22 are parallel to the inclined angle irons 16 and hence the roller table 17 is inclined upwardly being lower at the feed end than it is at the discharge end. The rollers 21 are adapted to be rotated in a counterclockwise direction (Fig. 1) through means of sprockets 23 secured to their shafts 24, said sprockets 23 being engaged by an endless chain 26 which conveys movement to said sprockets 23 from a variable speed motor 27 through a chain and sprocket drive mechanism 28.

Immediately above the roller table 17 (Fig. 1) and transverse thereto are mounted two cylindrical brush rollers 29 and 30, the shafts 31 and 32, respectively (Fig. 2), of which are journaled in like bearings 33 bolted to a pair of lateral angle irons 34 adjustably secured to angle members 36. Said members 36 are attached at a right angle to the inclined angle irons 16 by means of brackets 37 and lateral bars 38 are secured between the upper extremities of said members 36 thereby forming a superstructure 39 for supporting the rollers 29 and 30, a reservoir 41 (Fig. 1) and a dispensing device 42.

The dispensing device 42 (Fig. 3) is positioned immediately above the roller 30 and comprises a horizontal rod 43 secured in bearing blocks 44 mounted opposite each other on the lateral bars 38. A carriage 46 is pivotally mounted on the rod 43 for both rotational and transverse sliding movement, a depending portion 47 (Fig. 5) of said carriage 46 being provided with a transverse passage 48 for receiving a cylindrical bearing 49 through which the rod 43 extends. The bearing blocks 44 (Fig. 3) also journal a shaft 51 provided with a continuous, reversing thread 52 which mates with a downwardly projecting tooth 53 (Fig. 5) pivotally secured in the carriage 46 for rotation about a vertical axis. The thread 52 (Fig. 3) extends along the shaft 51 for substantially the entire width of the brush roller 30. The carriage 46 is thus supported by the rod 43 and the threaded shaft 51 for reciprocal movement in a transverse direction from one end to the other of said roller 30.

The tooth 53 (Fig. 5) is formed with an upstanding cylindrical stud 54 that rotatably mates with a vertical passage 56 drilled in the carriage 46. The stud 54 is smaller in diameter than the body of the tooth 53 thus providing a shoulder 57 on said tooth 53. Said shoulder 57 is adapted to bear against the lower surface of the carriage 46 thus enabling the thread engaging tooth 53 to support said carriage 46 substantially parallel to the inclined lateral bars 38. The stud 54 is loosely held in the passage 56 by a washer 58 secured to the free upper end of said stud 54 by a screw 59.

The threaded shaft 51 (Fig. 3) has a portion 61 of reduced diameter which extends outwardly beyond one of the bearing blocks 44 and has a sprocket 62 secured thereto. The shafts 31 and 32 also have outwardly extending portions 63 and 64, respectively, to which are secured sprockets 66, 67 and 68. The sprockets 62 and 68 (Fig. 1) have a chain 69 trained around them and said chain 69 is in turn wrapped around a sprocket 70 of the chain and sprocket mechanism 28 whereby counterclockwise rotation (Fig. 1) of the shafts 32 and 51 is obtained. A chain 71 is also trained around the sprockets 66 and 67 in order that the rollers 29 and 30 will both be rotated in the same direction, namely, counterclockwise as seen in Fig. 1, due to the rotation of the shaft 32.

A take-up lever 72 is loosely mounted on the shaft extension 64 (Fig. 3) and a sprocket 73 (Fig. 1) rotatably mounted on said lever 72 is urged against the chain 69 by a spring 74 tensioned between said lever 72 and the adjacent lateral angle bar 34. Thus, the chain 69 is continuously maintained snugly around the sprockets 62, 68 and 70. The chain 69 is sufficiently long that it may be used with different sized sprockets 62 and 68 should it be desired to change the relative speed of the shafts 51 and 32, respectively.

A pan 75 (Figs. 3 and 5) is provided beneath the rod 43 and the shaft 51 to catch any lubricant which may drip from them, thereby preventing contamination of the emulsion applying brush roller 30 positioned just beneath said rod 43 and said shaft 51. Said pan 75 is provided on each end with a tongue 75a (Fig. 2) each tongue being held between the bearing blocks 44 and the lateral bars 38.

The carriage 46 (Fig. 5) pivotally supports a needle valve 76, adjacent its rear extremity, for dispensing emulsion from the reservoir 41. The outlet pipe 77 of said valve 76 is threadably engaged in an enlarged portion 78 of a central aperture 79 formed in a support plug 81 that is rotatably mounted in a hole 82 provided in the carriage 46. The plug 81 has an enlarged head 83 which supports it in the hole 82. Around the periphery of the plug 81 there is an annular groove 84 adapted to register with a screw 86 which anchors said plug in the hole 82 while leaving it free to rotate therein. A pipe 87 is mated with an enlarged threaded portion 88 at the lower end of the central aperture 79, said pipe 87 having a passage 89 one end of which connects with the needle valve 76 through said aperture 79. The opposite end of said passage 89 is open and is disposed directly above the roller 30 (Fig. 2).

The needle valve 76 (Fig. 1) is supplied by gravity with a water-wax emulsion from the reservoir 41 through a flexible hose 91 attached to the bottom of said reservoir by a connection 92. The reservoir 41 is supported at the top of the superstructure 39 by two pairs of angle bars 93 and 94 which are fastened to the lateral bars 38 through transverse angles 95.

The operation of the machine is continuous. Upon rotation of the threaded shaft 51 in the direction of the arrow A (Figs. 3 and 4) the carriage 46 is oscillated continuously from one end of the roller 30 to the other, due to the urge of the continuous thread 52 upon the tooth 53. Said tooth 53 travels one direction in a flight 96 (Figs. 3 and 4) of said thread 52 until it reaches a reversing flight 97 at one extremity of said thread where it then travels in an opposite direction in a flight 98 until it reaches a similar reversing flight 99 at the other extremity of the thread 52, and so on, back and forth over the top of the roller 30 during the operation of the applicator.

The needle valve 76 should be pre-set to supply the proper amount of water-wax emulsion to the roller 30 in order that said roller may always be supplied with a uniform coating of said emulsion throughout its entire length. The proper setting of the valve 76 may be determined by experiment for different products and grades thereof. The needle valve 76 may be set to deliver a steady flow of emulsion or it may be adjusted to slowly drip emulsion upon the roller 30, but in any event the oscillation of the distributing valve 76 back and forth above the roller 30 will keep the entire periphery of said rotating brush 30 supplied with a uniform amount of emulsion. As previously stated, the speed of the screw shaft 51 may be varied by changing the size of the sprocket 62 whereby the brush traversing speed of the valve 76 may be regulated to give a further control feature to the device.

The produce, here shown as potatoes, is delivered over the feed chute 18 (Fig. 1) to the table rollers 21 and thence urged forward and upward, in the direction of the arrow B by said rollers 21 for delivery over the discharge chute 19 (Fig. 1). During this travel over the table 17, as the produce passes under the rotating emulsion-coated brush roller 30 said produce is gently brushed thereby, as seen in Fig. 2, so that an even thin film of protective emulsion is wiped over the entire surface of said produce. Upon reaching the roller 29 the produce is further brushed and polished to give it a luster and to further smooth out the film of water-wax emulsion applied to said produce by the roller 30.

In the modification disclosed in Figs. 6 and 7, the polishing brush 29 is replaced by a wide mop head 101 supported above the roller table 17 by a U-shaped bracket 102. Said bracket 102 is adjustably secured to angle irons 34a, similar to the lateral angle irons 34 of the previously described embodiment, by bolts 103 (Figs. 6 and 7) whereby the mop head 101 may be held at any desired distance from the table 17. The polishing action of the mop head 101 upon the waxed produce is best seen in Fig. 6, where the wiping or rubbing action of the free ends of the mop 101 upon the potatoes is apparent.

While I have described two embodiments of the present invention, it will be understood that various changes and modifications may be made in the details thereof without departing from the spirit and scope of the appended claims.

Having thus described the invention what I claim as new and desire to protect by Letters Patent is:

1. An applicator for coating the outer surface of objects with an even film of liquid comprising a table including means for rotating objects delivered to said table and for advancing said objects, a rotatable brush mounted above and transversely of said table for rubbing each object delivered to said table, a stationary shaft mounted above said brush in spaced parallel relation thereto, a carriage mounted on said shaft for movement axially thereon, a valve mounted on said carriage and adapted to dispense liquid to said brush, a liquid supply means communicating with said valve, a rotatable shaft supported in spaced parallel relation to said brush and having a continuous reversing thread, means on said carriage engaging said thread, means for rotating said threaded shaft to cause said carriage to reciprocate on its supporting shaft along the length of said brush for supplying liquid uniformly to said brush, and means for rotating said brush to apply said liquid evenly to each object passing said brush.

2. An applicator for applying a uniform film of flowable material to the outer surface of objects comprising means for advancing objects along a predetermined path, a roller mounted across the path of the advancing objects for wiping the same, a flowable material dispenser mounted for transversely reciprocating and longitudinally pivoting movement between the ends of the wiping roller for furnishing flowable material to said roller, means for reciprocating said dispenser from end to end of said roller to distribute the flowable material over substantially the entire length of said roller, said dispenser being operatively contacted from below by the reciprocating means at a point intermediate the dispenser's pivotal axis and its material discharge outlet for discretionary upward pivoting thereof in order to remove the dispenser from operative contact with the reciprocating means.

3. An applicator for applying a film of flowable material to the outer surface of objects comprising means for advancing objects along a predetermined path and for rotating the objects during such advancement, a rotatable object wiper extending transversely of the path of the advancing objects for applying flowable material to the advancing objects, means for rotating said wiper, means including a stationary shaft extending transversely of the predetermined object path, a carriage mounted on said shaft for slidable movement longitudinally thereof and a dispenser mounted on said carriage for supplying flowable material to said wiper, and means including a rotatable shaft extending transversely of the predetermined object path and having a continuous reversing thread for slidably reciprocating said carriage longitudinally of said stationary shaft to distribute the flowable material along substantially the entire length of said wiper.

References Cited in the file of this patent

UNITED STATES PATENTS

| | | |
|---|---|---|
| 1,115,426 | Green | Oct. 27, 1914 |
| 1,316,937 | Brewster | Sept. 23, 1919 |
| 1,618,159 | Ahlburg | Feb. 22, 1927 |
| 2,055,318 | Smith | Sept. 22, 1936 |
| 2,145,861 | Casto | Feb. 7, 1939 |
| 2,442,616 | Recker | June 1, 1948 |
| 2,578,427 | Hussey et al. | Dec. 11, 1951 |
| 2,595,151 | Lockwood | Apr. 29, 1952 |